Nov. 10, 1936.  J. D. HOUCK  2,060,420
WASTE TRAP
Filed May 9, 1934  2 Sheets-Sheet 2
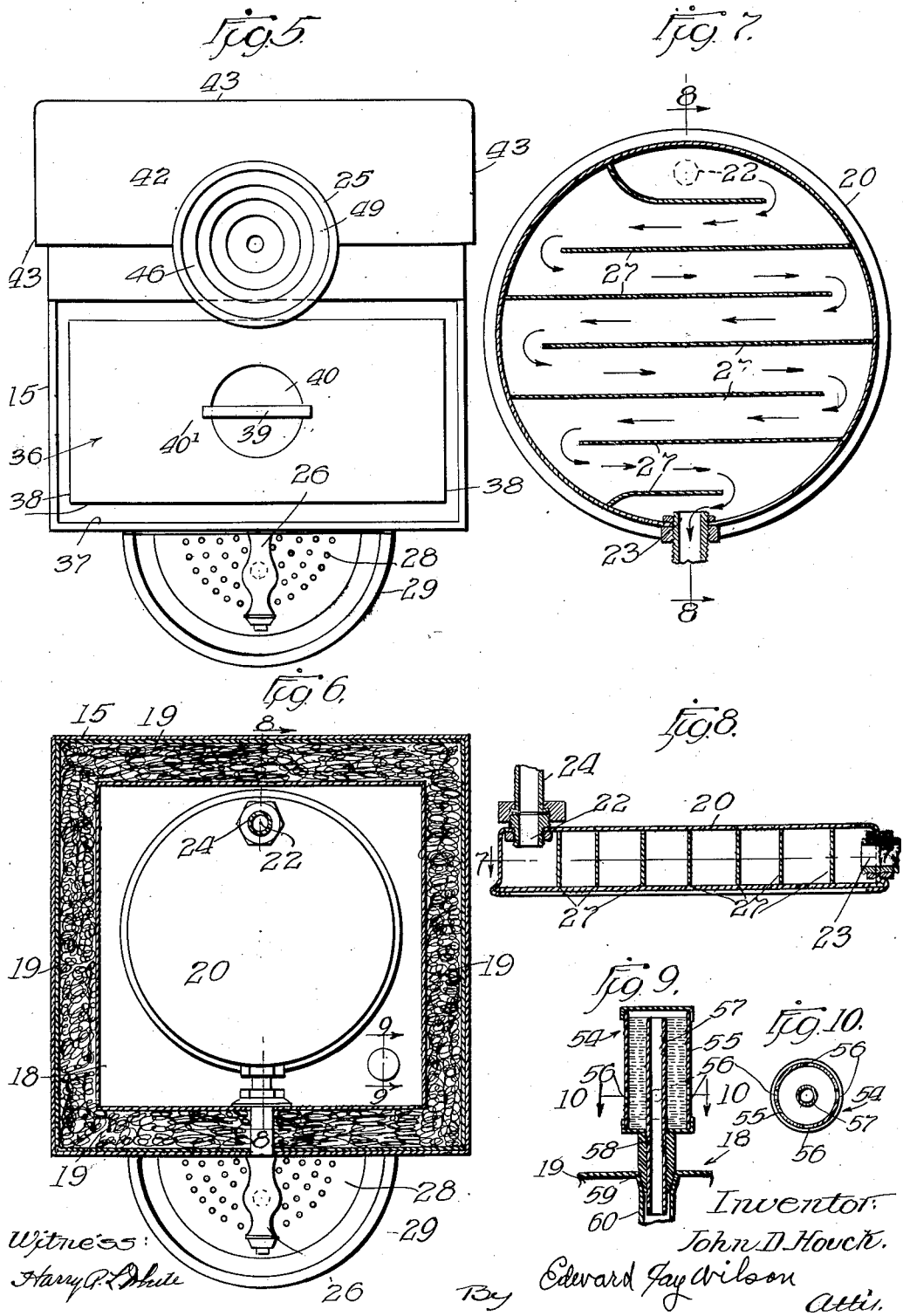

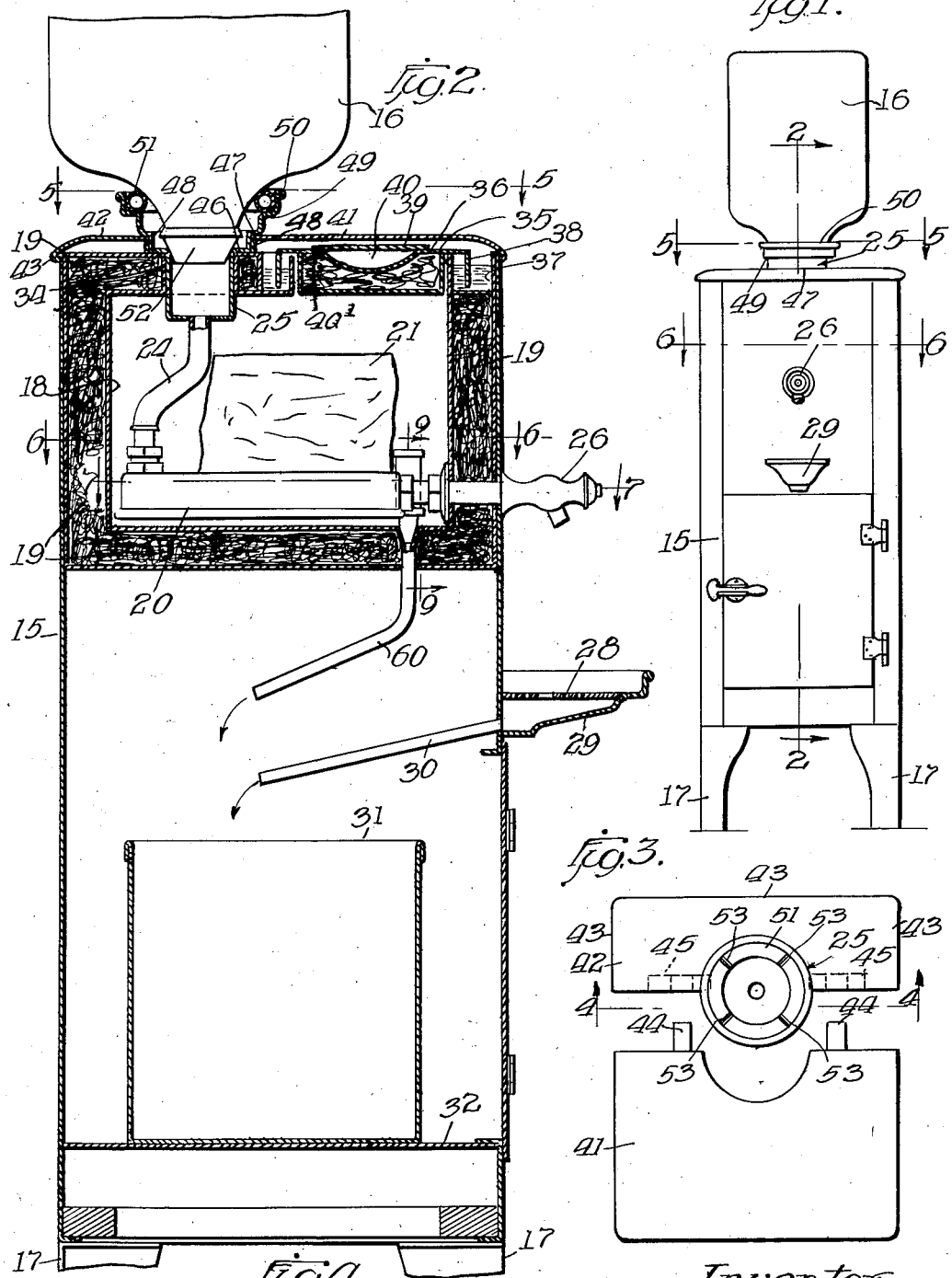

Patented Nov. 10, 1936

2,060,420

UNITED STATES PATENT OFFICE 2,060,420

WASTE TRAP

John D. Houck, Chicago, Ill.

Application May 9, 1934, Serial No. 724,664

3 Claims. (Cl. 182—7)

This invention relates to improvements in water coolers and has special reference to coolers which use ice as the cooling medium.

The object of the invention is to provide a cooler which shall more efficiently apply the cooling effect to the water; which shall be more effectively insulated against the heat of the surrounding atmosphere; the ice chamber of which shall be effectively sealed against the entrance of air; which shall be so constructed as to be conveniently iced; and which shall present a neat finished appearance.

The novel features of the invention are set forth in the appended claims. The invention itself, however, both as to its organization and its method of operation, together with additional objects and novel features and advantages thereof will best be understood from the following description of a specific embodiment taken in conjunction with the accompanying drawings forming part of this specification and in which:—

Fig. 1 is a front elevation of a water cooler embodying the invention in a preferred form;

Fig. 2 is a central vertical, fragmentary section taken on the line 2—2 of Fig. 1;

Fig. 3 is a top plan view, the top cover being separated;

Fig. 4 is a fragmentary vertical section on the line 4—4 of Fig. 3;

Fig. 5 is a horizontal section on the line 5—5 of Figs. 1 and 2;

Fig. 6 is a horizontal section on the line 6—6 of Figs. 1 and 2;

Fig. 7 is a horizontal section of the water holding element on the line 7—7 of Figs. 2 and 8;

Fig. 8 is a vertical section of the water holding element on the line 8—8 of Figs. 6 and 7;

Fig. 9 is a vertical section of the water drain trap on the line 9—9 of Fig. 6; and Fig. 10 is a horizontal section on the line 10—10 of Fig. 9.

In said drawings 15 represents a suitable casing for sustaining an inverted bottle 16 of water. The casing is held at a suitable height by legs 17 and is provided in its upper end with a cooling chamber 18 completely enclosed by double thickness heat insulating walls 19.

Within the chamber 18 and near the bottom wall there is arranged a hollow, closed, water-containing and cooling member 20. The water cooling member 20 is preferably flat to form a support for a mass of ice 21 which is the cooling medium, in the form of device shown.

The water cooling member 20 has an inlet 22 at one side and at its top, and an outlet 23 in the side wall and opposite to the inlet.

The inlet 21 is connected by a pipe 24 leading up to an enlarged cup or funnel-like member 25 arranged in the top wall of the cooling chamber and adapted to support the inserted water bottle 16 in position for delivering water to the cooling member 20. The outlet 23 of the cooling member 20 is connected to a suitable faucet 26 which is secured to the casing 1 for withdrawing the cooled water.

The interior of the cooling member 20 is divided by vertical walls 27 into a zig-zag passage from the inlet 22 to the outlet 23 so that the water in passing through the member 20 will have to travel an elongated passage from the inlet to the outlet and thus be efficiently cooled.

Below the faucet 26 is a perforated shelf 28 secured in the side wall of the casing 1 and arranged in a suitable collecting or drain member 29 to catch the drip and waste water. The member 29 delivers the waste water through a drain pipe 30 into a waste water receptacle 31 arranged in the lower part of the casing 15 on a shelf or bottom 32. The casing 15 is provided with a suitable hinged door 33 for convenience in removing the receptacle 31 from time to time as needed.

The top wall of the cooling chamber is provided with an opening 34 for receiving the member 25 and a second and larger opening 35 for convenience in placing the ice in the chamber.

The opening 35 is closed by a cover member 36 which is constructed similarly to the walls of the chamber in that it is hollow and filled with insulating material. Surrounding the opening 35 the top wall of the chamber is provided with a trough 37 adapted to contain water and the cover 36 has a dependent circumferential flange 38 arranged and adapted to depend into the water in the trough 37 and form an efficient water seal to prevent the entrance of air into the chamber past the cover 36.

The cover 36 is provided with a handle 39 by which it may be readily lifted out when it is necessary to renew the ice. In the form shown the top wall of the cover is forced down to provide a depression 40 and the handle 39 consists of a flat bar secured upon the top wall 40' of the cover and over the depression 40.

For the purpose of causing the top of the casing to provide a finished appearance, a false cover consisting of two parts 41 and 42 is provided of neat, smooth appearance and having rounded edges 43 projecting slightly over the top edges of the casing 15.

The two parts 41 and 42 of the false cover join on the center line of the inlet member 25 and the front part 41 is removable to expose the inner cover 36. The two parts of the false cover are dowelled together at their meeting edge. The front part 41 is provided with projecting tongues 44 and the rear part is provided with openings 45 to receive these projections as best shown in Figs. 3 and 4.

The opening 34 in the top wall of the casing is formed by a tubular member 34' extending through the top wall of the casing and the casing being relatively thick, this tubular member is relatively long. The funnel-like member 25 fits relatively tightly in this tubular member. Above the top wall of the casing, the member 25 is enlarged to provide a horizontal supporting flange 46. The wall of the member 25 is formed upwardly at the outer edge of the flange 46 providing a cylindrical part 48' equal in length to the thickness of the false cover 41 and at the upper end of this cylindrical part it is again expanded to form a horizontal flange-like part 49 extending over the false cover 41. The false cover is provided with a depending nozzle-like flange 48 arranged to fit around the vertical part 48' of the member 25. The fitting of the funnel-like member 25 in the tubular member 34' in co-operation with the seating of the horizontal supporting flange 46 provides a very secure and rigid connection of the member 25 with the casing. At the outer edge of the flange 49 the wall of the member 25 is again formed upwardly to provide a vertical flange 50 to provide a circumferential space to receive a soft packing ring 51 upon which the bottle 16 rests and which provides support for the bottle. The neck 52 of the bottle extends down into the top of the lower part of the member 25 and fits loosely therein, but with sufficient accuracy to hold the bottle upright with sufficient stability.

The ring 51 may be provided with surface grooves 53 of small area to permit sufficient air to enter the bottle to let the water flow down to replenish the water in the member 29 as the cool water is withdrawn.

A novel trap 54 is provided for preventing the waste water from the ice rising too high in the cooling chamber.

This trap consists of an outer casing 55 closed at its top and bottom and provided with inlet holes 56 near its lower end. There is an inner tube 57 sealed in the bottom of the casing 55 its upper end extending up within the casing to a point near its top, and the lower end extending down below the bottom of the casing. The lower end 58 of the tube 57 receives a tapered rubber packing member 59 the lower end of which is adapted to fit tightly in a drain pipe 60 sealed to the bottom wall of the chamber 18. The drain pipe is adapted to deliver the waste water from the ice into the receptacle 31.

In operation the water rises within the trap 54 until it overflows into the upper end of the inner tube. This trap forms an effective seal to prevent any free circulation of air into or out of the ice chamber but permits just sufficient air to enter to allow the discharge of the waste water. The trap 54 is located at one side and free of the water cooling member 20.

As melting ice leaves more or less sediment or scum, which has to be removed from time to time, the mounting of the trap 54 on the yielding tapered packing 59 permits the trap to be easily removed for cleansing and to be readily seated again in the bottom of the chamber. The tapered upper end of the drain tube 60 co-operates with the tapered packing to tightly seal the trap to the bottom of the chamber 18 and yet allow the trap to be readily removed and replaced.

I claim:—

1. A waste trap for an ice chamber, the trap having a closed vertically extending chamber having water inlets near its lower end, a central discharge tube fixed in the lower wall of said trap chamber and extending up adjacent to the top thereof, and extending down below the bottom of the chamber, the lower end of the discharge tube provided with a tapered, relatively soft packing, and the lower wall of the ice chamber provided with a discharge pipe sealed therein and provided with a tapered inlet to receive said packing.

2. A waste trap for use in a substantially sealed chamber, and adapted to be removably sealed in the bottom of the chamber and comprising a body having a delivery pipe extending from its bottom, a drain pipe sealed to the bottom of the chamber, the entrance end of the drain pipe being slightly tapered, the delivery pipe arranged to enter into the drain pipe, and a yielding packing on the delivery pipe tapered to co-operate with the entrance end of the waste pipe to seal the trap in the bottom of the casing and permit its ready removal.

3. A trap for use in a substantially sealed chamber adapted to contain ice, means for removably sealing the trap to the bottom of the chamber including a tapered, yielding packing, the trap having an outer substantially closed casing, provided with entrance openings near its lower end, and a delivery pipe extending up through the bottom of the casing and its ending at upper end adjacent the top wall of the trap casing, the delivery pipe sealed into the bottom wall of the trap casing.

JOHN D. HOUCK.